United States Patent
Dayan et al.

(10) Patent No.: US 6,892,305 B1
(45) Date of Patent: May 10, 2005

(54) METHOD AND SYSTEM FOR BOOTING UP A COMPUTER SYSTEM IN A SECURE FASHION

(75) Inventors: Richard Alan Dayan, Wake Forest, NC (US); Steven Dale Goodman, Raleigh, NC (US); Joseph Michael Pennisi, Apex, NC (US); Randall Scott Springfield, Chapel Hill, NC (US); James Peter Ward, Raleigh, NC (US); Joseph Wayne Freeman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/689,460

(22) Filed: Oct. 12, 2000

(51) Int. Cl.[7] .......................... G06F 9/00; G06F 12/14; H04L 9/32
(52) U.S. Cl. .............. 713/192; 713/1; 713/2; 713/185; 713/194
(58) Field of Search ............. 713/1, 2, 185, 713/192, 194; 380/286

(56) References Cited

U.S. PATENT DOCUMENTS

| | | | | |
|---|---|---|---|---|
| 4,593,384 A | * | 6/1986 | Kleijne | 365/228 |
| 5,892,906 A | * | 4/1999 | Chou et al. | 713/202 |
| 5,949,882 A | * | 9/1999 | Angelo | 713/185 |
| 6,463,537 B1 | * | 10/2002 | Tello | 713/182 |
| 6,557,104 B2 | * | 4/2003 | Vu et al. | 713/189 |

* cited by examiner

Primary Examiner—Gregory Morse
Assistant Examiner—Matthew Heneghan
(74) Attorney, Agent, or Firm—Carlos Munoz-Bustamante; Sawyer Law Group, LLP

(57) ABSTRACT

A method and system for booting up a computer system in a secure fashion is disclosed. The method and system comprise determining the presence of a security feature element during an initialization of the computer system wherein the security feature element includes a public key and a corresponding private key, storing a portion of the public key in a nonvolatile memory within the computer system if the security feature element is present and utilizing an algorithm to determine the presence of the security feature element prior to a subsequent boot-up of the computer system. Through the use of the present invention, a computer system is capable of being booted up whereby the computer system determines if a security feature element was previously present in the system. If a security feature element was previously present in the computer system, any stored keys, along with the secrets that they protect, are prevented from being compromised. It is also an object of the present invention to preclude the system from compromising any keys and associated secrets if a security feature element in the system was not previously present in the system.

51 Claims, 5 Drawing Sheets

| EEPROM contents | Security Card Status | Test Result |
|---|---|---|
| None | No Card Key | Pass |
| None | Card Key Installed | Fail |
| Stored Card Key | No Card Key | Fail |
| Stored Card Key | Card Key Installed (does not match EEPROM) | Fail |
| Stored Card Key | Card Key Installed (matches EEPROM) | Pass |

Figure 5

METHOD AND SYSTEM FOR BOOTING UP A COMPUTER SYSTEM IN A SECURE FASHION

FIELD OF INVENTION

The present invention relates generally to the field of computer security and particularly a method and system for booting up a computer system in a secure fashion.

BACKGROUND OF THE INVENTION

Personal computer systems in general have attained widespread use for providing computer power to many segments of today's modern society. Personal computer systems can usually be defined as a desktop, floor standing, or portable microcomputer that comprises a system unit having a single system processor and associated volatile and non-volatile memory. FIG. 1 is an example of a typical personal computer system 10. The personal computer system 10 typically includes an associated display monitor 11, a keyboard 12, one or more diskette drives 13, an associated printer 14, and a hard drive (not shown).

With the phenomenal growth and use of personal computers in the world in recent years, more and more data or information is being collected and retained or stored in such systems. A lot of this data is sensitive in nature. In the wrong hands, data could become embarrassing to individuals, a company could lose a competitive edge, or sensitive data could be used to force payment for silence or lead to physical violence against individuals. As more users recognize the sensitive nature of data and its value, the more it becomes desirable to protect against such misuse.

To protect themselves and the persons associated with the stored data, users are requiring the incorporation of security and integrity features into the personal computers that they purchase. Consequently, as security requirements for personal computer systems continue to become more sophisticated, the addition of cryptography hardware will become mandatory for some market segments. Other market segments will be unwilling to pay for the increased system cost resulting from the addition of what is perceived to be unneeded hardware. This dichotomy requires personal computer vendors to manufacture and maintain different system configuration whose only difference is the presence or absence of the cryptography hardware. Alternatively, some vendors may choose to manufacture a single system whose security features can be upgraded by adding a hardware module or card. In the latter case, some protection is needed to ensure that sensitive data (i.e., encryption keys) on the card, along with the secrets that they protect, are not compromised if the card is moved between systems.

Accordingly, what is needed is a method and system for determining whether a security card has been added/removed from a computer system thereby allowing the computer system to boot up in a more secure fashion. The method and system should be simple, cost effective and capable of being easily adapted to current technology. The present invention addresses such a need.

SUMMARY OF THE INVENTION

A method and system for booting up a computer system in a secure fashion is disclosed. The method and system comprise determining the presence of a security feature element during an initialization of the computer system wherein the security feature element includes a public key and a corresponding private key, storing a portion of the public key in a nonvolatile memory within the computer system if the security feature element is present and utilizing an algorithm to determine the presence of the security feature element prior to a subsequent boot-up of the computer system.

Through the use of the present invention, a computer system is capable of being booted up whereby the computer system determines if a security feature element was previously present in the system. If a security feature element was previously present in the computer system, any stored keys, along with the secrets that they protect, are prevented from being compromised. It is also an object of the present invention to preclude the system from compromising any keys and associated secrets if a security feature element in the system was not previously present in the system.

BRIEF DESCRIPTION OF THE DRAWINGS

FIG. 5 is an example of a comparison chart utilized by the method and system in accordance with the present invention.

DETAILED DESCRIPTION OF THE INVENTION

The present invention provides a method and system for booting up a computer system in a secure fashion. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention is presented in the context of a preferred embodiment. The preferred embodiment of the present invention is a method and system for booting up a computer system in a secure fashion. Essentially, the method and system in accordance with the present invention verifies whether the public key that was previously installed within the computer system (via a security feature element) has not changed since the installation of the key. This is achieved through the utilization of an algorithm contained within the basic input/output system ("BIOS") image. Accordingly, through the use of the algorithm, the computer system can be securely booted up whereby the public/private key pair of the security feature element, along with the secrets that they protect, are not compromised.

The security feature element that is used in conjunction with the method and system in accordance with the present invention preferably comprises a security card. This card adds support to the computer system for tamper detection, temperature monitoring, voltage status reporting, Alert on Lan II signal collection, and Secure Client signature generation.

The security card also includes nonvolatile storage for a hardware platform key pair, wherein the key pair includes a public key and a corresponding private key. The public/private key pair is subsequently utilized in conjunction with corresponding public/private key pairs within the computer system to unlock certain secret components of the computer system. Consequently, the utilization of the keys in an unauthorized manner must be avoided. Accordingly, the method in accordance with the present invention prevents such unauthorized use when a security card is moved from one system to another.

Although the above described security card is disclosed in the context of including a single public/private key pair, one of ordinary skill in the art will readily recognize that the security card in accordance with the present invention could include more than one public/private key pair while remaining within the spirit and scope of the present invention.

Figure 1:
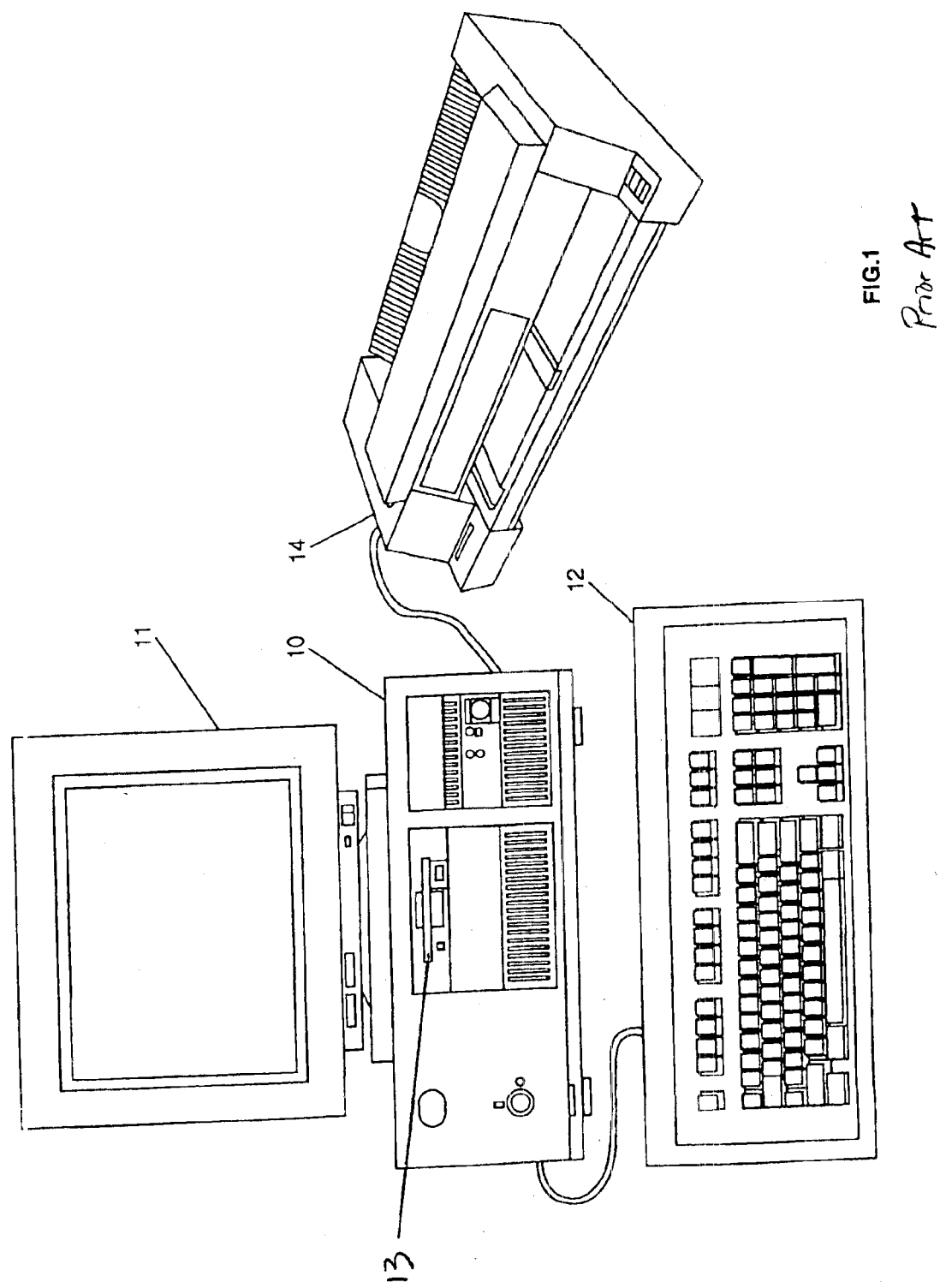
FIG. 1 is an example of a typical personal computer system.
Figure 2:
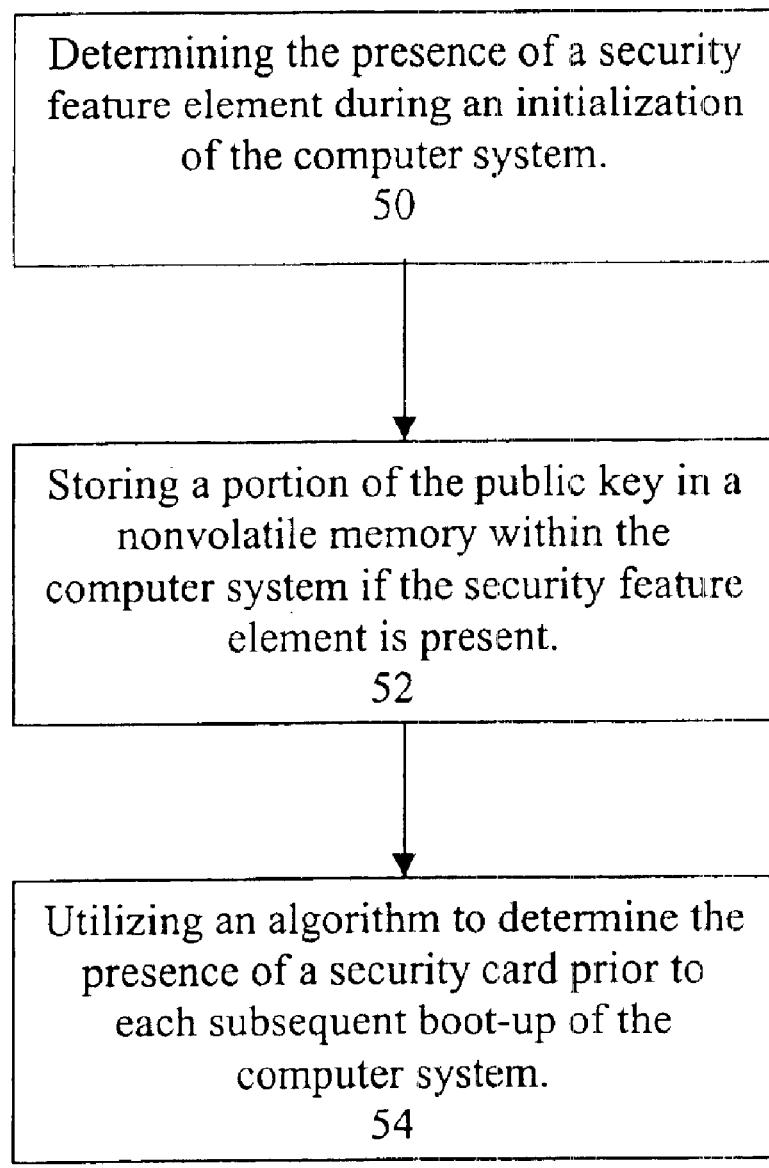
FIG. 2 is a high level flowchart of the method in accordance with the present invention.

To further understand the method in accordance with the present invention, please refer now to FIG. 2. FIG. 2 is a high level flowchart of the method in accordance with the present invention. First, a determination is made as to the presence of a security feature element during an initialization of a computer system, via step 50. Preferably, the security feature element comprises a security card that includes nonvolatile storage for a hardware platform key pair, wherein the key pair includes a public key and a corresponding private key. Next, a portion of the public key is stored in a nonvolatile memory within the computer system if the security feature element is present, via step 52. Preferably, during the first-time initialization, a portion of the public key contained on the security card is provided to the BIOS software whereby the BIOS software stores the portion of the public key into an Electrical Erasable Programmable Read Only Memory (EEPROM) contained within the computer system. Finally, an algorithm is utilized to determine the presence of the associated security card prior to each subsequent boot-up of the computer system, via step 54. Preferably, the BIOS software utilizes a binding algorithm during each subsequent Power-On-Self-Test ("POST") procedure to determine the presence of the security card prior to relinquishing control of the operating system.

The POST routines provide an extensive check for system integrity. These include for example, surveying the system configuration, performing sanity checks on system hardware, issuing diagnostic signals, etc. The BIOS software contains routines for interfacing to key peripherals, for interrupt handling, and so forth. The BIOS software itself is normally packaged in nonvolatile memory with other key pieces of software and management routines, as well as a pointer to launch the computer into the operating system software. In accordance with the present invention, as long as the correct security card is present during the POST routine, the computer system boots up in a normal fashion.

Figure 3:
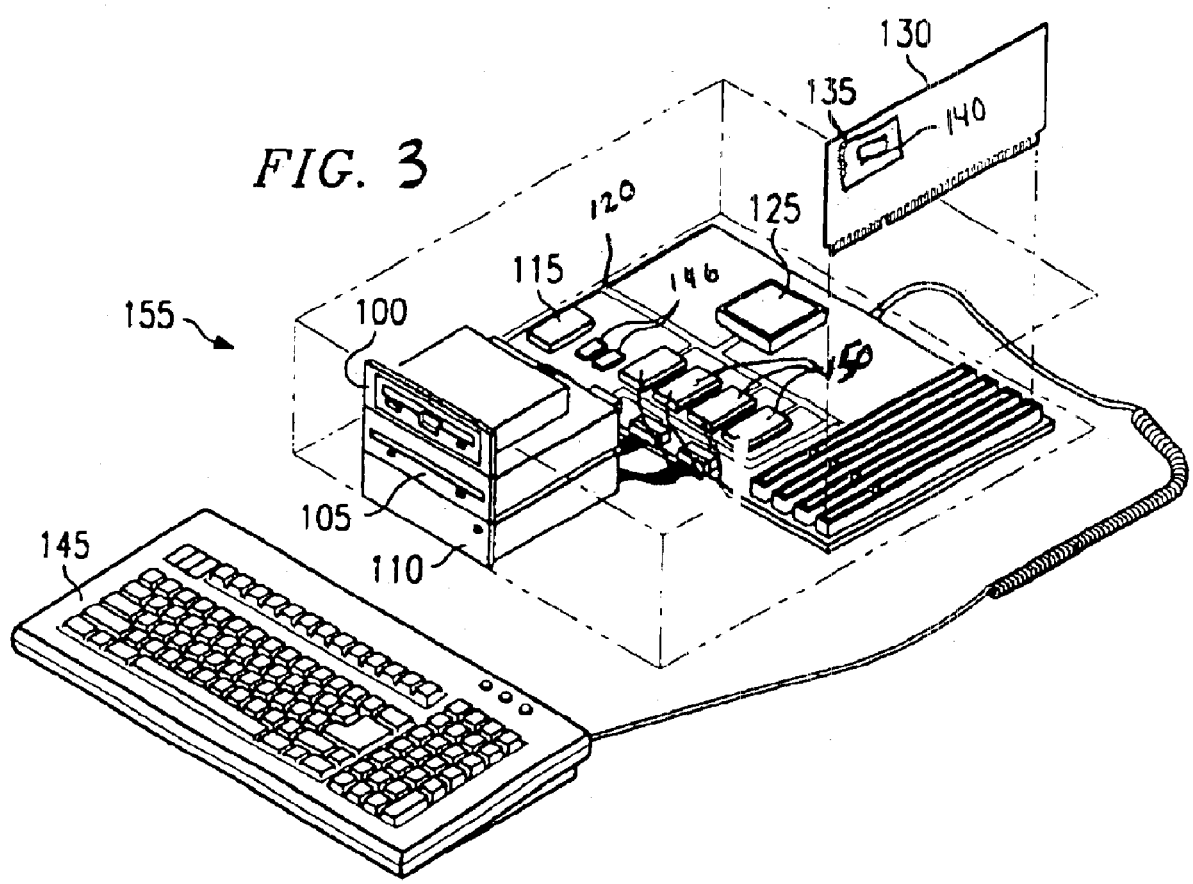
FIG. 3 schematically shows the insertion of the security card into a computer system.

For a better understanding of the present invention, please refer now to FIG. 3. FIG. 3 schematically shows the insertion of the security card 130 in accordance with the present invention into a computer system 155. The computer system 155 includes a CD-ROM 100, a floppy drive 105, a nonvolatile memory 115, a system board 120, a central processing unit (CPU) 125 and the security card 130. The security card 130 includes a microcontroller 135 which includes a small amount of nonvolatile memory 140 which contains a hardware platform key pair wherein the hardware platform key pair comprises a public key/private key pair. The nonvolatile memory also includes storage for a plurality of additional key pairs. The computer system 155 also includes a keyboard 145, BIOS modules 146 and random access memory (RAM) 150. In accordance with the present invention, each POST of the computer system utilizes a binding algorithm to ensure that the security card 130 has not been subjected to an unauthorized tamper event.

It should be noted that the above described computer system is only an example of a system in which the present invention could be implemented. Consequently, one of ordinary skill in the art will readily recognize that the present invention could be implemented in a wide variety of computer systems while remaining within the spirit and scope of the present invention.

Figure 4:
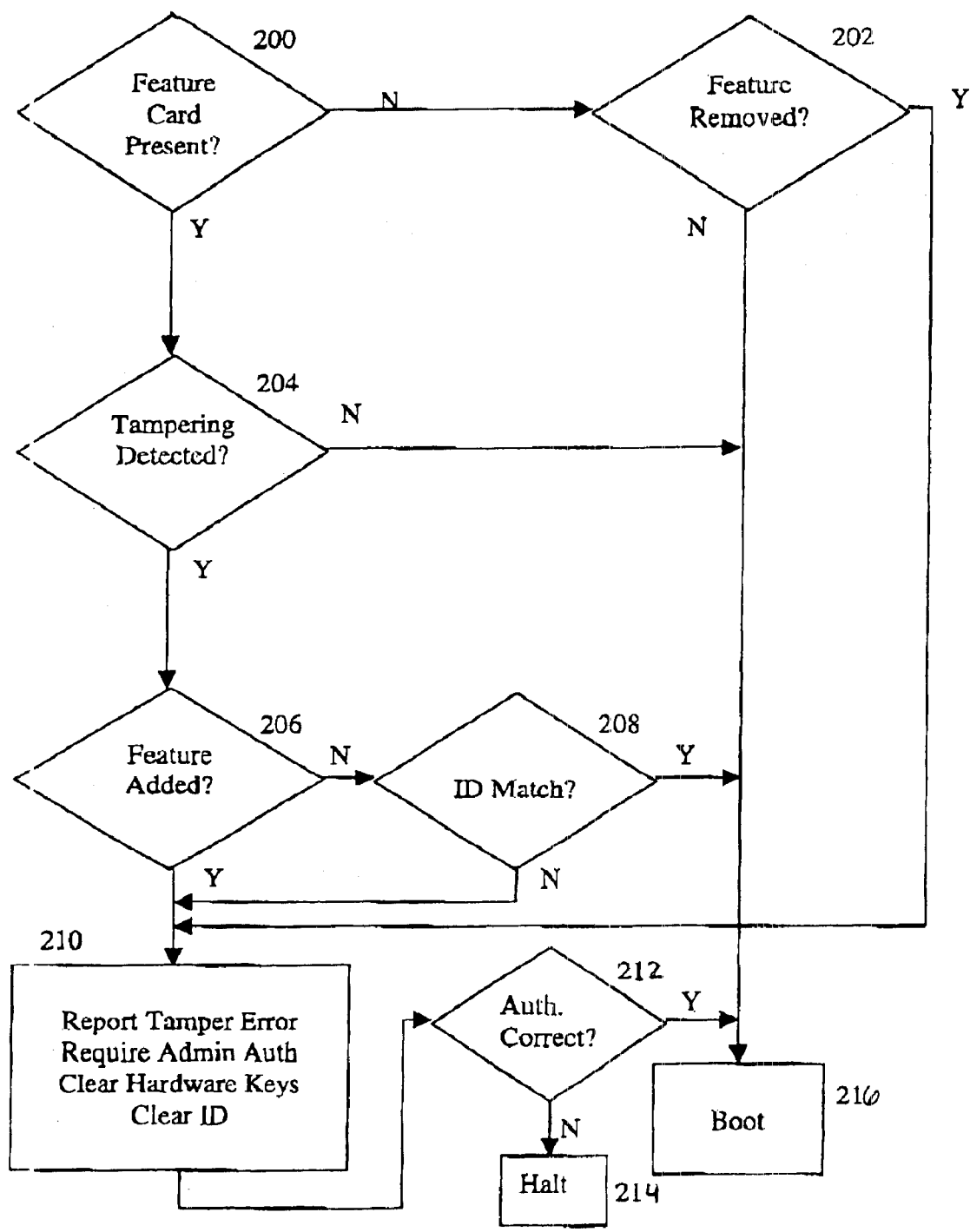
FIG. 4 is a flowchart of the algorithm in accordance with the present invention.

For a further understanding of the algorithm in accordance with the present invention, please refer to FIG. 4. FIG. 4 is a flowchart of the POST binding algorithm in accordance with the present invention. First, a determination is made as to whether a card is present, via step 200. If there is no card present, a determination is made as to whether a card was previously installed in the system and thus removed, via step 202. If a card wasn't previously installed then the system boots up normally, via step 216. If a card was previously installed and therefore removed, the portion of the public key contained in the EEPROM is cleared, via step 210. Preferably, a POST error is then issued that indicates that a card was previously installed in the system and the card has subsequently been removed i.e., some secret information related to the computer system may have been compromised. The user will then be prompted to provide some type of administrator authentication (i.e. administrator level password) to proceed with the boot-up process, via step 212. If the administrator authentication is not properly entered, the system will not boot-up, via step 214. If the administrator authentication is properly entered, the system will boot-up, via step 216.

Referring back to step 200, if a card is present, a determination is made as to whether the system has been tampered with, via step 204. Preferably, this step involves the utilization of a cover tamper switch and a tamper latch, wherein the tamper latch is used to indicate whether the system cover was opened. It should be noted that the tamper latch could be equipped to be triggered based on a variety of tamper events i.e. power being removed from the security element, etc. If the system has not been tampered with, the system boots up normally, via step 216. If the system has been tampered with, a determination is made as to whether the card has been added to the system, via step 206. Preferably, the binding algorithm is equipped with logic that is capable of determining whether or not a card is supposed to be present within the system based on the completion of a previous POST sequence.

Consequently, if the card is a feature that has been added to the system, the portion of the public keys of the previously installed card that are contained in the EEPROM are cleared, via step 210. The user will then be prompted to provide some type of administrator authentication to proceed with the boot-up process, via step 212. If the administrator authentication is not properly entered, the system will not boot-up, via step 214. If the administrator authentication is properly entered, the system will boot-up, via step 216.

Referring back to step 206, if the card is not a feature that has been added to the system, the portion of the public key is read from the card and is compared with the portion of the public key contained in the EEPROM, via step 208. Preferably, this step involves the utilization of a comparison chart such as the one shown in FIG. 5. If the keys match (i.e. if the test result is "pass"), the system boots up normally, via step 216. If the keys don't match (i.e. if the test result is "fail"), the user is notified and the keys stored on the card as well as the keys contained in the EEPROM are cleared, via step 210. The user will then be prompted to provide some type of administrator authentication to proceed with the boot-up process, via step 212. If the administrator authentication is not properly entered, the system will not boot-up, via step 214. If the administrator authentication is properly entered, the system will boot-up, via step 216.

An additional feature of the method and system in accordance with the present invention is associated with the unlikely event that a card is installed while power is being applied to the system. If a card is installed while power is being applied to the system, the card will assert a signal to force a reset of the system. This is done in order to force the system to execute the POST sequence before any malicious activity can occur on the card to clear evidence of a tamper event. This will appear to the system BIOS as a cold boot and the tamper latch will be activated to indicate a tamper event.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for booting up a computer system in a secure fashion comprising:
   a) determining the presence of a security feature element during an initialization of the computer system, wherein the security feature element is installed within a housing of the computer system such that a cover to the housing is opened to remove the security feature element, and wherein the security feature element stores a public key and a corresponding private key;
   b) storing a portion of the public key from the security feature element in a nonvolatile memory within the computer system if the security feature element is present; and
   c) utilizing an algorithm to determine the presence of the security feature element prior to a subsequent boot-up of the computer system, wherein additional authorization is required to be input to the computer system to boot up the computer system if the security feature element is not present and was previously present in the computer system.

2. The method of claim 1 wherein the security feature element comprises a security card.

3. The method of claim 2 wherein the security card provides for tamper detection of the computer system and the security card, temperature monitoring of the computer system and voltage status reporting of the computer system.

4. The method of claim 1 wherein step c) is performed during a Power-On-Self-Test (POST) sequence.

5. The method of claim 4 wherein step c) further comprises:
   c1) determining the presence of the security feature element.

6. The method of claim 5 wherein step c1) further comprises:
   c1a) determining if the computer system has been subjected to a tamper event if the security feature element is present.

7. The method of claim 5 wherein step c1) further comprises:
   c1a) determining whether a security feature element was previously present in the computer system if the security feature element is not present.

8. The method of claim 7 wherein step c1) further comprises:
   c1b) clearing the portion of the public key stored in the non-volatile memory of the computer system if a security feature element was previously present in the computer system; and
   c1c) prompting for an authorization prior to booting up the computer system.

9. The method of claim 7 wherein step c1) further comprises:
   c1b) booting up the computer system if the security feature element was not previously present in the computer system.

10. The method of claim 6 wherein step c1) further comprises:
    c1b) booting up the computer system if the computer system has not been subjected to a tamper event.

11. The method of claim 6 wherein step c1) further comprises:
    c1b) determining whether the security feature element is an added feature of the computer system, wherein the determination is based on a previous POST sequence, if the computer system has been subjected to a tamper event.

12. The method of claim 11 wherein step c1) further comprises:
    c1c) clearing the portion of the public key stored in the nonvolatile memory of the computer system from previously-installed security feature elements if the security feature element is a newly added feature of the computer system; and
    c1d) prompting for an authorization prior to booting up the computer system.

13. The method of claim 11 wherein step c1) further comprises:
    c1c) comparing the public key on the security feature element with the portion of the public key stored in the nonvolatile memory of the computer system if the security feature element is not a newly added feature of the computer system.

14. The method of claim 13 wherein step c1) further comprises:
    c1d) booting up the computer system if the public key on the security feature element matches the portion of the public key stored in the nonvolatile memory of the computer system.

15. The method of claim 13 wherein, if the public key on the security feature element does not match the portion of the public key stored in the non-volatile memory of the computer system, step c1) further comprises:
    c1d) clearing the portion of the public key stored in the nonvolatile memory of the computer system;
    c1e) clearing the public key and the corresponding private key stored on the security feature element; and
    c1f) prompting for an authorization prior to booting up the computer system.

16. The method of claim 6 wherein the tamper event includes the cover of the housing of the computer system having been opened.

17. The method of claim 1 wherein the security feature element comprises a security card installed in a slot of a system board in the computer system.

18. A system for booting up a computer in a secure fashion, the system comprising:
   means for determining the presence of a security feature element during an initialization of the computer system, wherein the security feature element is installed within a housing of the computer system such that a cover to the housing is opened to remove the security feature element, and wherein the security feature element stores a public key and a corresponding private key;
   means for storing a portion of the public key from the security feature element in a nonvolatile memory within the computer system if the security feature element is present; and
   means for utilizing an algorithm to determine the presence of the security feature element prior to a subsequent boot-up of the computer system, wherein additional authorization is required to be input to the computer system to boot up the computer system if the security feature element is not present and was previously present in the computer system.

19. The system of claim 18 wherein the security feature element comprises a security card.

20. The system of claim 19 wherein the security card provides for tamper detection of the computer and the security card, temperature monitoring of the computer and voltage status reporting of the computer.

21. The system of claim 18 wherein the algorithm is utilized during a Power-On-Self-Test (POST) sequence.

22. The system of claim 21 wherein the means for utilizing the algorithm further comprises:
   means for determining the presence of the security card.

23. The system of claim 22 wherein the means for utilizing the algorithm further comprises:
   means for determining if the computer has been subjected to a tamper event if the security card is present.

24. The system of claim 23 wherein the means for determining the presence of the security card further comprises:
   means for booting up the computer if the computer has not been subjected to a tamper event.

25. The system of claim 23 wherein the means for determining the presence of the security card further comprises:
   means for determining whether the card is a newly added feature of the computer, wherein the determination is based on a previous POST sequence, if the computer has been subjected to a tamper event.

26. The system of claim 25 wherein the means for determining the presence of the security card further comprises:
   means for clearing the portion of the public key stored in the nonvolatile memory of the computer from previously installed security feature elements if the card is a newly added feature of the computer; and
   means for prompting for an authorization prior to booting up the computer.

27. The system of claim 25 wherein the means for determining the presence of the security card further comprises:
   means for comparing the public key on the security card with the portion of public key stored in the nonvolatile memory of the computer if the security card is not a newly added feature of the computer.

28. The system of claim 27 wherein the means for determining the presence of the security card further comprises:
   means for booting up the computer system if the public key on the security card matches the portion of the public key stored in the nonvolatile memory of the computer.

29. The system of claim 27 wherein the means for determining the presence of the security card further comprises:
   means for clearing the portion of the public key stored in the nonvolatile memory of the computer, and for clearing the public key and the corresponding private key stored on the security card, if the public key on the security feature element does not match the portion of the public key stored in the nonvolatile memory of the computer system; and
   means for prompting for an authorization prior to booting up the computer if the public keys stored in the nonvolatile memory and the security feature element are cleared.

30. The system of claim 23 wherein the tamper event includes the cover of the housing of the computer system having been opened.

31. The system of claim 22 wherein means for utilizing the algorithm further comprises:
   means for determining whether a security card was previously present in the computer if the security card is not present.

32. The system of claim 31 wherein the means for determining the presence of the security card further comprises:
   means for clearing the portion of the public key stored in the non-volatile memory of the computer if a security card was previously present in the computer; and
   means for prompting for an authorization prior to booting up the computer.

33. The system of claim 31 wherein the means for determining the presence of the security card further comprises:
   means for booting up the security system if the security card was not previously present in the computer.

34. The system of claim 18 wherein the security feature element comprises a security card installed in a slot of a system board in the computer system.

35. A method for booting up a computer system in a secure fashion comprising:
   a) determining the presence of a security feature element during an initialization of the computer system wherein the security feature element includes a public key and a corresponding private key;
   b) storing a portion of the public key in a nonvolatile memory within the computer system if the security feature element is present; and
   c) upon, and prior to, a subsequent boot-up of the computer system,
   1) determining the presence of the security feature element;
   2) determining whether the computer system and security feature element have been subjected to a tamper event if the security feature element is present;
   3) determining whether the same security feature element was present previously in the computer system; and
   4) allowing the computer system to be booted up if the security feature element is present, if the computer system has been subjected to a tamper event, and if the same security feature element is determined to have been previously present.

36. The method of claim 35 wherein the same security feature element is determined to have been previously present by checking whether the public key of the security feature matches the stored portion of the public key in the nonvolatile memory within the computer system.

37. The method of claim 36 wherein the same security feature element is determined to have been previously present by determining whether the security feature element is an added feature of the computer system.

38. The method of claim 37 wherein step c) is performed during a Power-On-Self-Test (POST) sequence, and wherein determining whether the security feature element is an added feature of the computer system includes checking a previous POST sequence.

39. The method of claim 35 further comprising allowing the computer system to be booted up if the security feature element is present and if the computer system has not been subjected to a tamper event.

40. The method of claim 35 further comprising determining whether a security feature element was previously present in the computer system if the security feature element is not present.

41. The method of claim 40 wherein, if the security feature element is not present and if a security feature element was previously present in the computer system, further comprising clearing the portion of the public key stored in the non-volatile memory of the computer system and prompting for an authorization prior to booting up the computer system.

42. The method of claim 35 wherein step c) is performed during a Power-On-Self-Test (POST) sequence, and further comprising determining whether the security feature element is an added feature of the computer system if the computer system has been subjected to a tamper event, wherein the determination is based on a previous POST sequence.

43. The method of claim 42 wherein, if the security feature element is a newly added feature of the computer system and if the computer system has been subjected to a tamper event, further comprising:

clearing the portion of the public key stored in the nonvolatile memory of the computer system; and prompting for an authorization prior to booting up the computer system.

44. The method of claim 35 wherein, if the public key on the security feature element does not match the portion of the public key stored in the nonvolatile memory of the computer system, further comprising:

clearing the portion of the public key stored in the nonvolatile memory of the computer system;

clearing the public key and the corresponding private key stored on the security feature element; and prompting for an authorization prior to booting up the computer system.

45. The method of claim 35 wherein the security feature element comprises a security card installed in a slot of a system board in the computer system.

46. The method of claim 35 wherein the security feature element is installed within a housing of the computer system such that a cover to the computer system must be opened to remove the security feature element.

47. The method of claim 35 wherein a tamper event includes a cover to a housing of the computer system being opened.

48. A method for booting up a computer system in a secure fashion comprising:

a) determining the presence of a security feature element during an initialization of the computer system wherein the security feature element includes a public key and a corresponding private key;

b) storing a portion of the public key in a nonvolatile memory within the computer system if the security feature element is present; and c) utilizing an algorithm during a Power-On-Self-Test (POST) sequence of the computer system to:

1) determine the presence of the security feature element prior to a subsequent boot-up of the computer system;

2) determine if the computer system has been subjected to a tamper event if the security card is present;

3) determine whether the security card is an added feature of the computer system, wherein the determination is based on a previous POST sequence, if the computer system has been subjected to a tamper event;

4) compare the public key on the security card with the portion of the public key stored in the nonvolatile memory of the computer system if the security card is not a newly added feature of the computer system; and 5) if the public key on the security card does not match the portion of the public key stored in the nonvolatile memory of the computer system, i) clear the portion of the public key stored in the nonvolatile memory of the computer system;

ii) clear the public key and the corresponding private key stored on the security card; and iii) boot up the computer system.

49. The method of claim 48 wherein step c) further comprises clearing the portion of the public key stored in the nonvolatile memory of the computer system and prompting for an authorization prior to booting up the computer system, if the security feature element is a newly added feature of the computer system.

50. The method of claim 48 wherein step c) further comprises booting up the computer system if the public key on the security feature element matches the portion of the public key stored in the nonvolatile memory of the computer system.

51. The method of claim 48 wherein step c) further comprises booting up the computer system if the computer system has not been subjected to a tamper event.

* * * * *